United States Patent

[11] 3,565,043

[72] Inventor William Jeter Carmouche
 353 Stanford Ave., East Baton Rouge, La. 70808
[21] Appl. No. 829,667
[22] Filed June 2, 1969
[45] Patented Feb. 23, 1971

[54] FISH-GROWING AQUARIUM
 3 Claims, 10 Drawing Figs.
[52] U.S. Cl. ................................................ 119/3, 119/2
[51] Int. Cl. ..................................................... A01k 63/00
[50] Field of Search ............................................ 119/2, 3, 5, 78, 51, 80, 79, 51.11

[56] References Cited
 UNITED STATES PATENTS

| | | | |
|---|---|---|---|
| 742,415 | 10/1903 | Hale | 119/3 |
| 848,101 | 3/1907 | Hale | 119/3 |
| 2,944,513 | 7/1960 | Keely | 119/3 |
| 3,116,712 | 1/1964 | Ogden et al. | 119/3 |
| 3,371,652 | 3/1968 | Louks et al. | 119/51.11 |
| 3,418,973 | 12/1968 | Saito | 119/3 |
| 3,437,075 | 4/1969 | Hawes Jr., et al. | 119/51 |

FOREIGN PATENTS

| 14,930 | 7/1904 | Great Britain | 119/78 |
|---|---|---|---|

*Primary Examiner*—Aldrich F. Medbery

ABSTRACT: An aquarium device for successful and economical growing of a concentrated number of fish from frys and fingerlings to maturity in a minimum of space, consisting of an upper fish habitat compartment, with a water-supply spray, and a lower control compartment separated by a slanted partition to guide waste matter and pollutants through an adjustable flow hole into the lower compartment. The water discharged into the lower compartment rises and presses the air in the lower compartment through an adjustable air control valve connected to an extension which releases air bubbles into the water of the upper compartment to aerate the water and to create a circulation which releases carbon dioxide into the atmosphere and which encourages contaminants to settle. A screen above the partition prevents the escape of fish through the discharge opening and does not permit them to disperse the contaminants which have settled. After the lower compartment is filled, the water is discharged automatically and fresh air enters. A valve is then closed and the process is continued. The adjustable air valve contains the conventional one-way flow feature which stops the downward flow of water. The adjustable flow hole includes a conventional pressure valve feature, which reduces the flow of water when the float controlled discharge outlet is opened to flush lower compartment. Safety features assure the continual removal of waste matter. A feeder is activated and controlled by the falling water supplying the aquarium. A conventional air pump can be used to aerate in emergencies. A conventional shallow pan, not shown, should be suspended submerged in water of upper aquarium compartment for feeding mash to small fry when they are being grown.

INVENTOR:
William J. Carmouche

SEC. 2-2

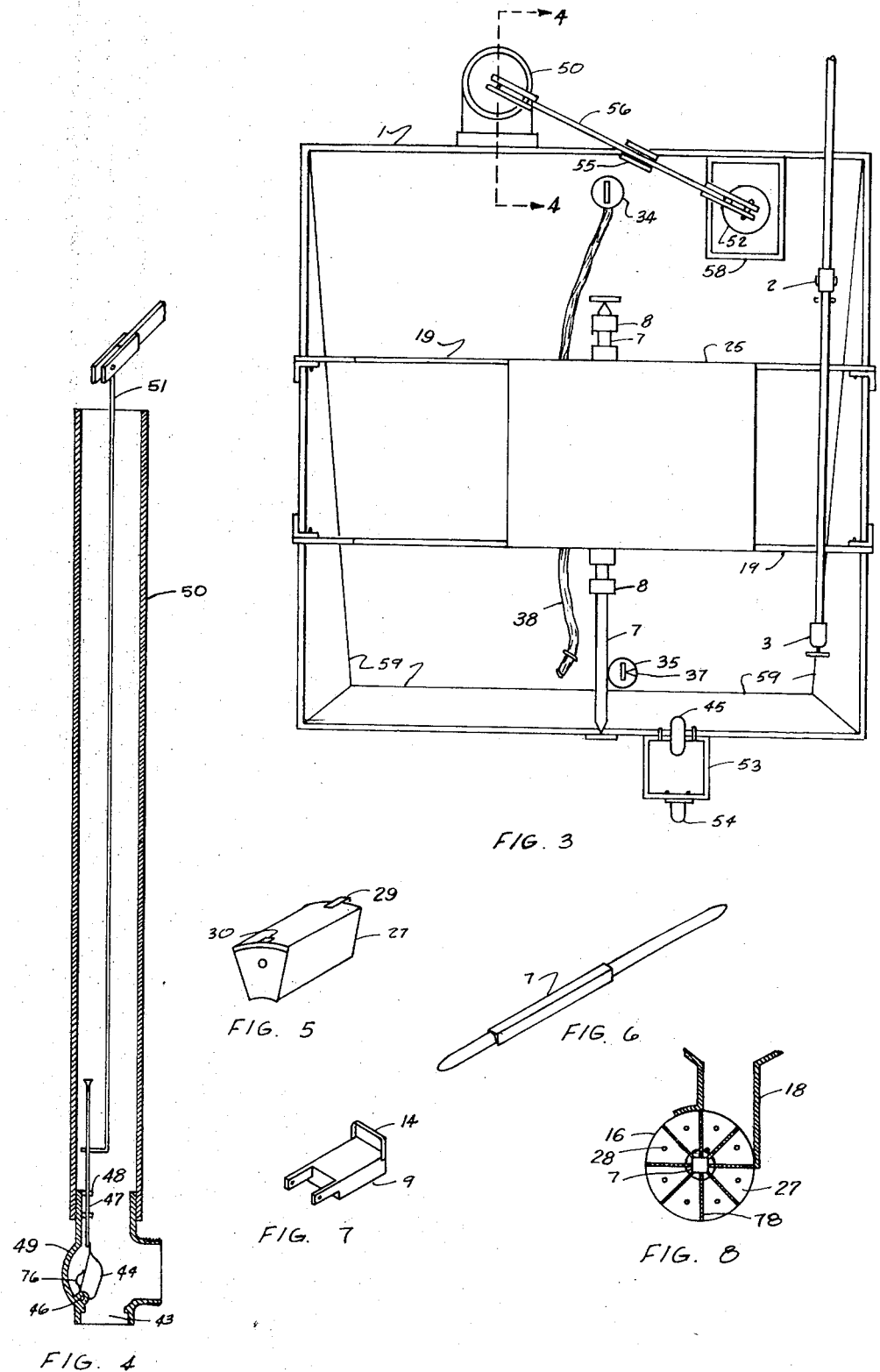

FISH-GROWING AQUARIUM

The purpose of this invention is to automate, improve and simplify the irrigation, aeration, feeding, harvesting and waste removal precess in the catfish and other food fish industry by the operation of a simple new aquarium. To adequately describe this purpose it is necessary to make a brief comparison between the results achieved from current technological practices and the results which are foreseeable through this new invention.

The most efficient methods presently used require heavy initial investment in pond construction and high operating expenses. The ponds must be drained periodically for harvesting or for reconditioning. Feed for the fish must be distributed over large areas manually or by use of expensive mechanical equipment. The harvesting operations are laborious and primitive.

During the growing season the excrement from the fish and the uneaten food pellets settle and accumulate at the bottom of the pond causing stagnation and pollution. To prevent distress and mortality expensive aerators and water agitators must be used.

Normally a 40-acre pond requires the use of a 6-inch pump supplying 1,200 gallons of water per minute to replace water lost through evaporation and seepage and to prevent excessive stagnation.

Because of the inherent limitations imposed by present methods it is feasible to grow a maximum of only 2,000 pounds of catfish per acre of pond per year. Even where raceways are used an enormous amount of contaminants accumulate.

Research at Auburn University has demonstrated that 500 1-pound catfish can be group in a cage, 1 cubic meter in size, placed within a pond. This would represent a concentration of approximately 2 million catfish per acre. However, no more than four such cages containing a total of 2,000 catfish could be placed in each acre of a still pond receiving enough pumped water to maintain a constant level, because the fish could not survive in this accumulation of pollution.

Other experiments disclosed that 84 fish could be grown in 1 cubic yard or 560,000 in one acre of aquariums 3 feet deep with two replacements of water daily. However, tedious effort was involved because of the lack of advanced devices for feeding and maintenance of the fish in a sanitary condition.

This invention comprises a number of closely integrated new units which form a system for automatically irrigating, aerating and feeding fish in aquariums and removing waste matter, while eliminating the need to harvest, without the consumption of additional power.

Each of the units depends upon the other units for successful operation and are a necessary component of the entire system. While reducing the incidence of disease and parasites the aquarium permits convenient and economical treatment when necessary. The constant flow of water to irrigate the aquarium provides the power to operate the feeder, thus eliminating the use of manual labor or costly equipment. The weight of the water drained from the aquarium into an air tank below accomplishes the flushing and aerating functions, thus cleaning the water and providing a supplementary supply of oxygen. The removal of waste and the injection of air bubbles serves the purpose of reducing the amount of water needed to maintain a healthy condition of the fish.

One form of the generic invention is illustrated in FIGS. 1 through 8 and another form is shown in FIG. 9 of the accompanying drawings.

FIG. 3 is a top view of the fish-growing system.

FIG. 4 is a cross section 4–of FIG. 3.

FIG. 5 is a perspective of one of the plugs to be fitted into a new-type dispenser to adjust the quantity of fish food to be delivered.

FIG. 6 is a perspective of a shaft which supports the food dispenser and the new-type water wheel having a special-type timing device.

FIG. 7 is a perspective of the water-wheel float.

FIG. 8 is a sectional view of the food dispenser.

Figure 1:
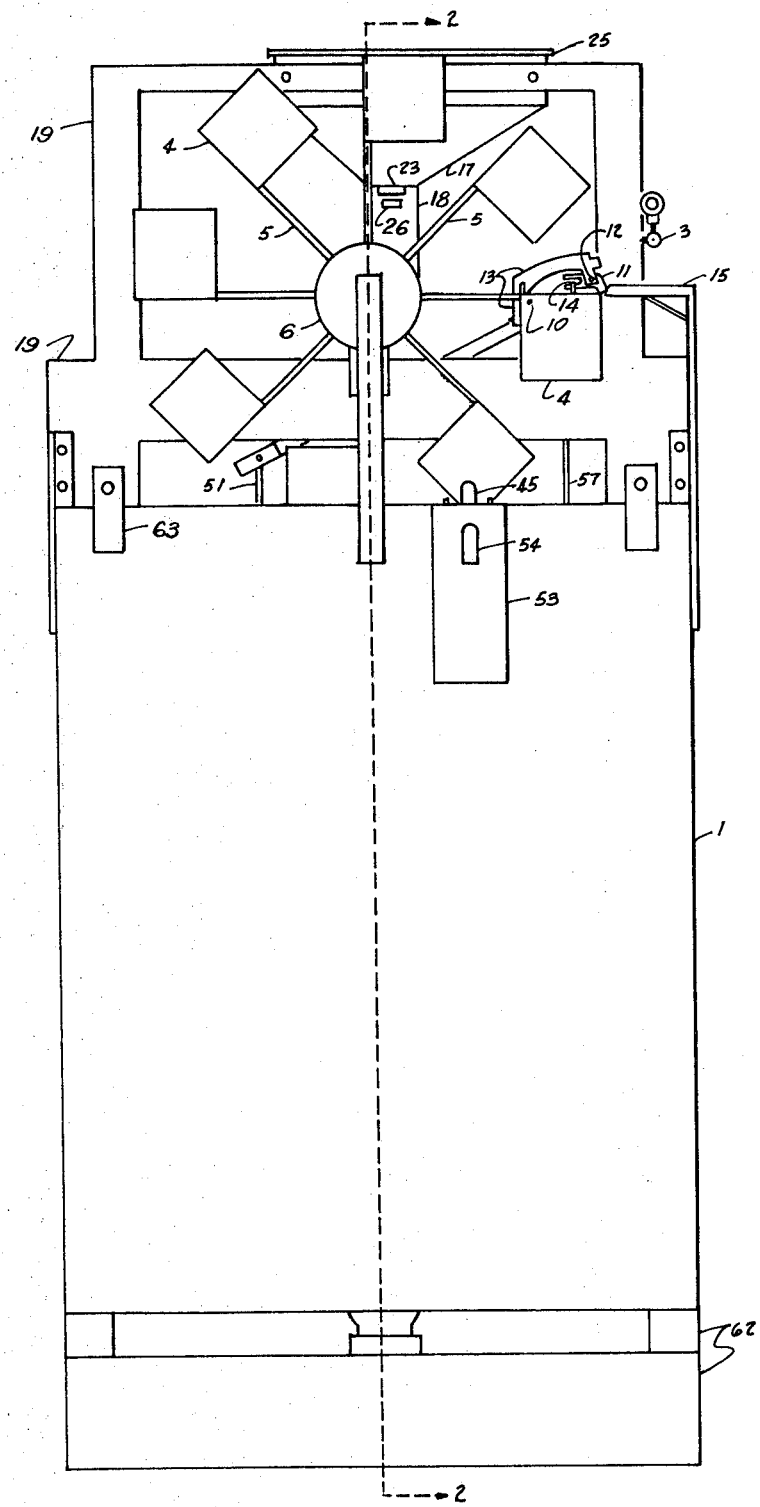
FIG. 1 shows an elevation of one side of a specially organized aquarium.
Figure 2:
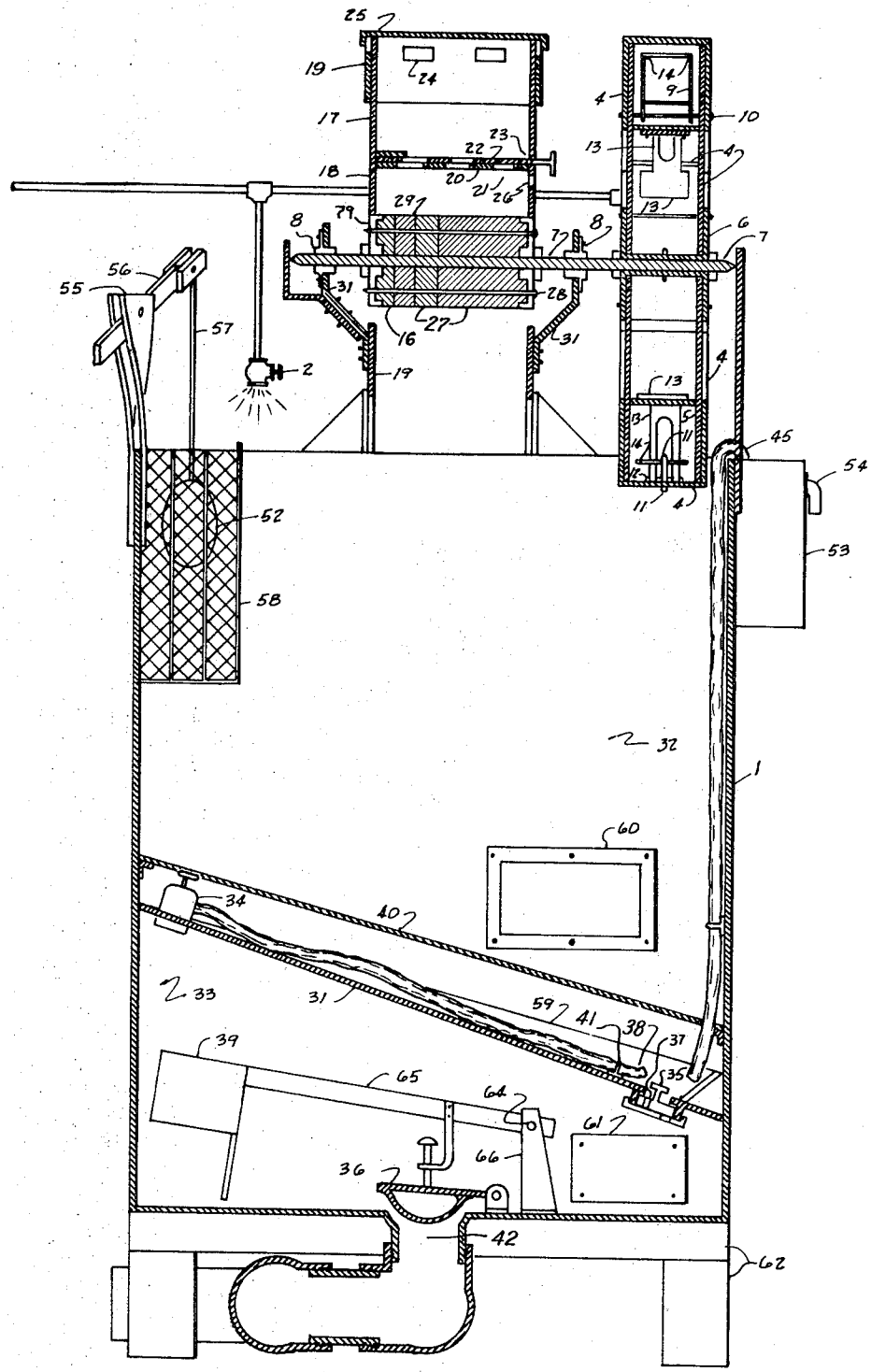
FIG. 2 is a cross section 2–2 of FIG. 1.

A large concentration of food fish can be maintained and grown in tank or aquarium 1 economically and in excellent health because the apparatus automatically flushes the waste matter settling at the bottom and provides constant aeration while supplying a controlled spray of water and a regulated amount of food. Water is sprayed into the tank system at the desired rate of flow by adjustment of faucet 2. Faucet 3 controls the flow of water into buckets 4 affixed to arms 5 which in turn are attached to the discs of spool 6. The spool is connected to the shaft 7 which appears in FIGS. 2, 3 and 6. Shaft 7 rotates intermittently on bearings 8, shown in FIGS. 2 and 3, as water from faucet 3 fills each successive bucket 4, which contains a float 9 movable on hinge 10 and a trigger 11 movable on pin 12 supported by arm 13 which is bent near its center for attachment to the back of bucket 4. Float 9 is provided with a trigger release or loop 14 both shown in FIG. 7. Different views of trigger release are shown in FIGS. 1, 2 and 7. Stop 15 interrupts the motion of the water wheel when the protruding tip of the trigger 11 makes contact. As the bucket 4 fills with water from faucet 3, float 9 is lifted thereby pressing release 14 against the upper jaw of trigger 11 to slide the tip of trigger 11 away from stop 15 so that the weight of the water moves the bucket downward, causing the water wheel to rotate intermittently and to turn the shaft which operates the feed dispenser 16 at a controlled rate. The water wheel, consisting of the buckets, their regulating devices, the arms, the spool and the shaft, is unique and distinct in that it permits the full utilization of all the gravitational force available in the water held by the buckets while regulating the speed of rotation by merely adjusting the faucet. Since the frictional resistance encountered in the rotation of the feed dispenser 16 fluctuates the dispenser would turn too rapidly, too slowly, or not at all unless the controlling devices in the buckets 4 were used. While the bucket is being filled no food is put into the tank. After it is filled the bucket is released, emptying its water and dispensing a predetermined amount of fish food into the aquarium. The water wheel is then stopped again by the trigger tip on the next bucket and the process is repeated continuously. Arm 13 shown in FIG. 1 belongs on each bucket.

Upper compartment 17 and lower compartment of fish-food hopper is supported by frame 19. The upper and lower compartments are separated by a horizontal floor 20 having openings 21 which can be opened or closed by moving back and forth slide 22, having corresponding openings, through slot 23. The purpose of the slide and partition is to admit into the lower compartment a limited amount of the floatable fish-food pellets which are more suitable in this tank system for fish culture. The space in the lower compartment can be adjusted by insertion of plugs to admit the maximum quantity of food needed during a single period. Screened window 24 allows fish food to fall from it by admitting air when cover is in place. Screen window 26 serves same purpose in lower compartment of hopper. Dispenser 16 seen in FIGS. 2 and 8 consists of a series of troughs formed with partitions 78 and ends 79, supported by shaft 7. The upper right quadrant of the dispenser is situated beneath the lower compartment 18 of the hopper, so that it is filled with fish-food pellets while the bucket of the water wheel is being filled with water. After the water wheel rotates one-eighth of a revolution the food in one of the troughs is emptied into the aquarium while another trough is moved into position to be filled. Plugs 27 are held in position by rods 28 and by extensions 29 which fit in grooves 30. These plugs are used to further adjust the quantity of food delivered into the trough and later into the aquarium. Three controls are thereby provided to regulate the rate of feeding, namely adjustment of faucet flow, adjustment of space in lower compartment in conjunction with slide 22 and the use of plugs in the dispenser trough.

The shaft 7 holding dispenser 16 and water wheel turn on bearings 8 which are supported by braces 31 connected to frame 19.

The regulated feeder is a necessary feature of this invention for efficient operation of a large number of aquarium.

Slanted partition 31 separates the tank 1 into two sections, the aquarium section 32 and the air and flushing compartment 33 which is airtight when valve 34, stopper 35 and flush bulb 36 are closed. By adjusting stopper 35 water is allowed to flow through opening 37 or a series of openings carrying with it the excrement of the fish and the particles of disintegrated food pellets which settle to the bottom of the aquarium section 32 and slide downward toward the stopper opening by the force of gravity. As the amount of water in the flushing compartment increases slightly the air space therein diminishes causing a compression which prevents the further flow of water through the opening 37. After valve 34 is opened slightly bubbles of air emerge through tip of hose 38 and rise through the water of the aquarium where the fish are grown. The difference between the weight of the column of water above the tip 38 and the weight of the column of water above the opening 37 determines the force pressing the flow of water and waste matter through opening 37. As the flow proceeds the flush compartment is gradually filled with water while remaining air is gradually released through tip 38. Float 39 then lifts flush bulb 36 and compartment 33 is quickly flushed of the accumulated water and waste matter. The flow through opening 37 continues, but the flush bulb 36 drops into position, closing the bottom of compartment 33 after the flush is completed to start the filling process again automatically. This cycle continues indefinitely without further opening of the valve 34 or the stopper 35. The utilization of these principles of behavior in gases and water permits both the flushing of waste matter before it has a chance to pollute the aquarium, and the aeration of the aquarium without consuming any more energy than that normally required to pump water needed by the fish. Screen 40 allows the waste material to sink to the bottom 31 and prevents the fish from agitating the sediment and mixing it with the clear water above. A conventional shallow pan, not shown, should be suspended submerged in water of upper aquarium compartment for feeding mash to small fry when they are being grown. The intermittent flush of the bottom compartment effectively removes all solid contaminating substances which could not be accomplished by the use of a bottom drain overflow pipe with a sleeve around it because the sleeved pipe moves the bottom too slowly to lift the solid waste. If such a device as the sleeve pipe were to allow a flow fast enough to remove the solid waste then this would necessitate the pumping of a prohibitive volume of water. Magnet 41 attached near tip of hose permits the placing of the tip releasing the bubbles of air at different levels on the partition 31. The rate of air released through the tip and the rate of the flow of water through opening 37 are accordingly regulated in three ways; by adjusting air valve 34, by adjusting opening 37 and by raising or lowering hose tip 38. In this manner, the system can be set to produce a complete replacement of the entire volume of water in the aquarium two, three or more times each day as determined advisable by taking into consideration the size and concentration of the fish. These elements of the invention are unique and distinct in that they provide regular irrigation, flushing and aeration of aquariums without the expenditure of additional effort or operating expense, making use of pneumatic and hydraulic phenomena and the force of gravity in the water which would otherwise be simply drained away. The adjustable air valve contains the conventional one-way flow feature which stops the downward flow of water. The adjustable flow hole includes a conventional pressure valve feature, which reduces the flow of water when the float controlled discharge outlet is opened to flush lower compartment.

A ball-joint valve, not drawn, is connected to the float and used to reduce the flow of water from upper compartment while the water in lower compartment is being flushed out.

Orifice 42 at bottom of air compartment 33 leads water to open outlet 43, shown in FIG. 4, through which fresh air is drawn into the compartment as the water rushes out before bulb 36 drops to close orifice 42.

Trap door 44 and siphon 45 are safety features to prevent the water level from falling too low or rising too high in the aquarium. The trap door is hinged to pin 46 and kept open with trigger 47 held in position by guides 48 attached to joint 49 which is connected to auxiliary tank shown in FIGS. 3 and 4. Rod 51 lifts trigger 47 to close trap door with action of spring 76 when floating weight 52 drops too low as a result of the fall of the water level in the aquarium. The closing of the trap door causes the auxiliary tank 50 to fill with water and prevents the operation of bulb 36 while water continues to be sprayed into the aquarium. To prevent the overflow of the aquarium, siphon 45 begins to function drawing the water from the bottom of the aquarium 32 and releasing it into secondary tank 53 having an outlet 54 which drains the water and maintains a constant level in the aquarium. Trap door 44 is shown in position before being set.

Fulcrum 55 supports lever 56 holding rod 57 affixed to floating weight 52 which floats within guide frame 58.

Plastic form 59 rests on partition surface 31 and serves to guide waste matter toward opening 37. The tank 1 can be constructed of glass, metal, wood, or other suitable material. Window 60 permits observation of fish within the tank is constructed of opaque material. Service window 61 provides access to compartment 33. Platform 62 permits the lifting of the entire tank, after the removal of feeder devices and auxiliary tanks by use of a fork lift for moving to a loading area for the transfer of the marketable sized fish to transportation tanks. Grips 63 facilitate the hoisting of the aquarium containing water and marketable fish. Pin 64 hinges the float arm 65 to fulcrum 66.

Figure 9:
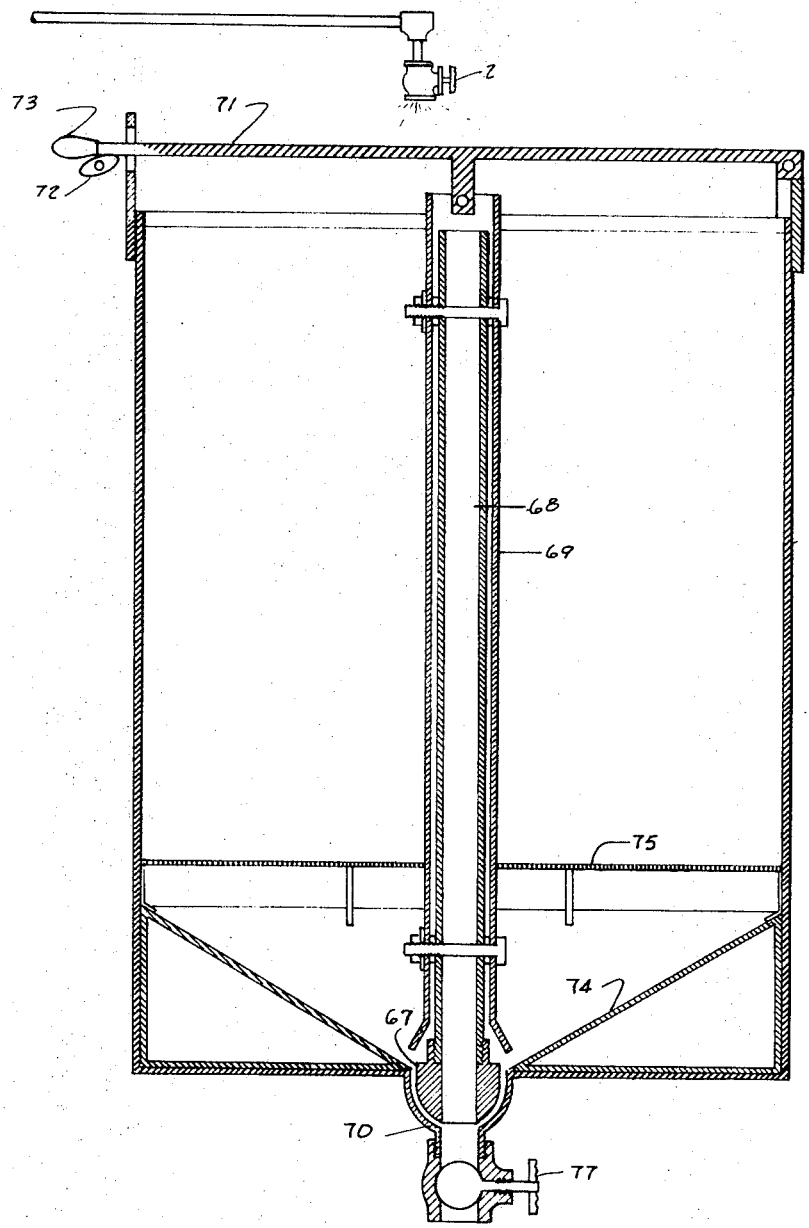
FIG. 9 is a sectional view of a modification and simplification of the generic fish-growing system.

FIG. 9 shows a particular species of the generic system.

Flush plug 67 attached to overflow pipe 68 enclosed within bottom drain sleeve 69 is movable up and down, to allow limited flushing action through opening 70, when lever 71 is lifted mechanically with cam 72, operatable by a motor or manually with handle 73. Plastic form 74 rests on bottom of tank and guides the waste matter, through gravitational action, toward opening 70. Hardware cloth 75 rests on form 74 and serves as a guard to prevent the fish from creating a disturbance with the water space where organic matter settles. Tank bottom can be flat or concave.

This modification of the generic invention is unique and original in that it creates a single device to provide bottom drain and flushing action to remove contamination material as it settles for the intensive cultivation of food fish in concentrated numbers within aquariums. This species of the invention does not possess the advantages of the aerator but the operational features are more simple and cost of construction will be less.

Valve 77 can be attached to outlet 70, to flush the waste sediment, as a substitute for the movable lever 71, flush plug 72, sleeve 69, and overflow pipe 68. Siphon 45 would then be extended to siphon water from lower level into a secondary tank 53 for release through overflow drain 54.

Figure 10:
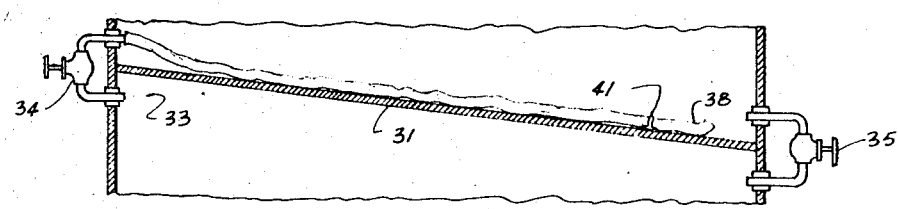
FIG. 10 is part of FIG. 2 showing alternative aerating and drain-flush features.

FIG. 10 shows alternative arrangement of air valve 34 and stopper valve 35 in a pipe circuit on exterior of aquarium. The pipe connected with the air valve leads to the inside of aquarium compartment 32 while the pipe connected to the stopper valve 35 leads to inside of lower compartment 33 permitting external adjustment in flow of air and drain of pipe. Stopper valve 35 will also permit periodic flushing of the accumulated wastes in lower part of aquarium.

Since the movement of the waste matter is focused toward the flush opening at the bottom of the tank, since the floating pellets can be dispensed slowly to encourage maximum consumption and minimum deterioration, since the impurities are removed effectively without removing the floating pellets, since a steady stream of oxygenized water is sprayed into the aquarium, since the water is continuously aerated and since water removed from the aquarium can easily be filtered through gravel channels covered with aerobic microorganisms and used successfully a number of times, it is possible to grow great quantities of food fish in small areas.

A pump supplying 40 acres of ponds capable of yielding 80,000 catfish would suffice to supply the water demands for growing 560,000 fish in 1 acre of aquariums. Charcoal filters and aerators are combined with system.

The principal benefits and objectives of this invention are:
1. Produce from 500,000 to 2,000,000 1-pound food fish in 1 acre of aquariums containing fish in water 3 feet deep, instead of 2,000 food fish in 1 acre of pond.
2. Reduce the amount of food to produce each fish.
3. Reduce the cost of operations.
4. Reduce initial land and construction costs.
5. Provide for observation and treatment of fish.
6. Eliminate harvesting labor.
7. Through aeration and flushing contaminants from aquariums, reduce water requirements in producing 1,000,000 food fish to an amount comparable with the water requirements to produce 80,000 food fish in 40 acres of pond.

I claim:

1. An aquarium device for raising fish in concentrated quantities in a minimum space comprising an upper fish-growing aquarium compartment including a water supply therefor and a lower water control compartment, a downwardly inclined partition means between the compartments for separating them and guiding waste matter and other pollutants to the lower end at one side of the upper chamber, a first adjustable-discharge flow hole in the partition adjacent its lower end, an adjustable air-control valve at the upper end of said partition connecting the compartments and including an outwardly extending adjustable-length air-discharge means for releasing bubbles of air through the end thereof, said end being adjacent said first discharge hole, a second discharge means at a lower portion of said water control chamber including a first float operated closure valve therefor; a safety flow control valve means for said second discharge means, an operating means for said safety valve means including a second float in said growing compartment connected to a release means for said safety flow valve means, and an auxiliary water tank for control of water in said aquarium compartment, at a level at the top thereof, having an overflow outlet and a water siphon means connected thereto, said siphon means having an end remote from said auxiliary tank located adjacent said lower end of one side of the upper chamber whereby the flow of water from said aquarium tank is automatically controlled to cycles of filling and discharge at optium intervals for the size quantity of fish grown therein.

2. An aquarium device as defined in claim 1 which includes a feeder means supported upon the upper compartment, a water wheel, with buckets, rotatable on an axis connected to the support, to receive power from the water supply, a spool with a series of troughs along its surface affixed around an extension of the axis to measure and dispense food as it turns beneath a hopper supported by a frame attached to the upper compartment.

3. An aquarium device as defined in claim 1 which includes a screen across the inside of the upper fish compartment, above the partition, to prevent the escape of fish and the agitation of sediment.